United States Patent
Lee et al.

(10) Patent No.: US 7,851,739 B2
(45) Date of Patent: Dec. 14, 2010

(54) PROJECTION APPARATUS AND METHOD FOR ACTIVATING A PROJECTION APPARATUS

(75) Inventors: Chung-Chin Lee, Hsin Chu (TW);
Ming-Che Wu, Hsin Chu (TW);
Chi-Hsun Huang, Hsin Chu (TW);
Chien-Chiu Hsueh, Hsin Chu (TW)

(73) Assignee: Coretronic Corporation, Hsinchu (TW)

( * ) Notice: Subject to any disclaimer, the term of this patent is extended or adjusted under 35 U.S.C. 154(b) by 438 days.

(21) Appl. No.: 12/105,509

(22) Filed: Apr. 18, 2008

(65) Prior Publication Data
US 2009/0033883 A1    Feb. 5, 2009

(30) Foreign Application Priority Data
Aug. 2, 2007    (TW) ............................. 96128371 A

(51) Int. Cl.
*H01L 27/00*    (2006.01)
(52) U.S. Cl. ..................................... 250/208.1; 250/205
(58) Field of Classification Search .............. 250/208.1, 250/205, 214 R, 216; 353/85, 94, 121; 348/801
See application file for complete search history.

(56) References Cited

U.S. PATENT DOCUMENTS 7,046,143 B2 *    5/2006    Al-Khateeb .................. 340/541

* cited by examiner

*Primary Examiner*—Que T Le
(74) *Attorney, Agent, or Firm*—Ladas & Parry, LLP

(57) ABSTRACT

A projection apparatus includes an illuminating unit, an imaging unit, a lens unit, and a control unit. The illuminating unit includes a light source, and a light source driving module operable to drive the light source to provide an illumination beam. The imaging unit is operable so as to modulate the illumination beam into an image beam. The lens unit is disposed on an optical path of the image beam for projecting the image beam. The control unit is coupled electrically to the illuminating unit and the imaging unit. The control unit is configured to execute an activating thread for initializing the imaging unit after controlling initial driving of the light source by the light source driving module, and a monitoring thread for monitoring the light source driving module for a success signal that indicates successful provision of the illumination beam by the light source.

8 Claims, 4 Drawing Sheets

PROJECTION APPARATUS AND METHOD FOR ACTIVATING A PROJECTION APPARATUS

CROSS-REFERENCE TO RELATED APPLICATION

This application claims priority of Taiwanese Application No. 096128371, filed on Aug. 2, 2007.

BACKGROUND OF THE INVENTION

1. Field of the Invention

The invention relates to a projection apparatus and a method for activating a projection apparatus, more particularly to a projection apparatus that can be quickly activated and a method for quickly activating a projection apparatus.

2. Description of the Related Art

As multimedia presentations become ever more popular, while performance of projectors continues to improve and prices of projectors continue to drop, the market for projectors is growing. Manufacturers are striving to develop a market for commercial projectors. In addition, projectors provide a good choice for home theater systems as images projected thereby are large in size.

As shown in FIG. 1, a conventional projection apparatus includes a control unit 11, a video input unit 12, a memory unit 13, an illuminating unit 14, an optical unit 15, an imaging unit 16, and a lens unit 17. The control unit 11 manages the operation of the conventional projection apparatus. The video input unit 12 receives a plurality of video sources. The memory unit 13 stores an activation program 131 therein. The illuminating unit 14 includes a light source 141, and a light source driving module 142 operable to drive the light source 141 to provide an illumination beam 140. The optical unit 15 is disposed on an optical path of the illumination beam 140 to guide the illumination beam 140 into the imaging unit 16, and includes a color wheel 151, a motor driver 152 operable to drive rotation of the color wheel 151, a light combining unit 153 (e.g., an integrator rod), and at least one optical element 154. The imaging unit 16 includes an imaging module 161, and an imaging driving module 162 operable to drive the imaging module 161 to modulate the illumination beam 140 received from the optical unit 15 into an image beam 160. The lens unit 17 is disposed on an optical path of the image beam 160 to project the image beam 160.

With further reference to FIG. 2, a method for activating the conventional projection apparatus includes the following steps:

In step 901, the conventional projection apparatus is turned on such that the control unit 11 is activated after electrical power is supplied thereto.

In step 902, the control unit 11 retrieves the activation program 131 from the memory unit 13 for executing an activating thread 111.

In step 903, the control unit 11 controls driving of the light source 141 of the illuminating unit 14 by the light source driving module 142 during execution of the activating thread 111.

In step 904, the control unit 11 waits for an acknowledgement from the light source driving module 142 regarding whether the light source 141 successfully provides the illumination beam 140 as the activating thread 111 goes into an idle loop. If the light source 141 is successful in providing the illumination beam 140, the flow proceeds to step 905, where the light source driving module 142 transmits a feedback signal to the control unit 11. If the idle loop has elapsed for a predetermined amount of time, e.g., 3 seconds, and the control unit 11 has not received the feedback signal from the light source driving module 142, the flow goes back to step 903, where the control unit 11 once again controls the driving of the light source 141 by the light source driving module 142.

Subsequently, in step 906, the control unit 11 controls initialization of the imaging module 161 of the imaging unit 16 by the imaging driving module 162. If the conventional projection apparatus is a digital light flowing (DLP) projector, the imaging module 161 can be a digital micromirror device (DMD), and the imaging driving module 162 can be a corresponding chip, such as a DAD1000 chip.

Next, in step 907, the control unit 11 transmits a splash logo signal, e.g., corresponding to a trademark for a manufacturer of the conventional projection apparatus, to the imaging module 161 such that the imaging module 161 modulates the illumination beam 140 into the image beam 160 that corresponds to a splash logo image, which is subsequently projected by the lens unit 17. At this point, execution of the activating thread 111 is completed.

It normally takes more than five seconds from turning on of the conventional projection apparatus before the splash logo image is projected. This slow speed is the result of the activating thread 111 going into the idle loop when the control unit 11 waits for the feedback signal from the light source driving module 142, and the control unit 11 continuing the rest of the activating thread 111 only after the feedback signal is received. Consequently, there exists a need for a fast (e.g., within two seconds) way to activate a projector.

SUMMARY OF THE INVENTION

Therefore, the present invention is to provide a projection apparatus that may be activated quickly, and to provide a method for quickly activating a projection apparatus.

According to one aspect of the present invention, there is provided a projection apparatus that includes an illuminating unit, an imaging unit, a lens unit, and a control unit. The illuminating unit includes a light source, and a light source driving module operable to drive the light source to provide an illumination beam. The imaging unit is operable so as to modulate the illumination beam into an image beam. The lens unit is disposed on an optical path of the image beam for projecting the image beam. The control unit is coupled electrically to the illuminating unit and the imaging unit. The control unit is configured to execute an activating thread for initializing the imaging unit after controlling initial driving of the light source by the light source driving module, and a monitoring thread for monitoring the light source driving module for a success signal that indicates successful provision of the illumination beam by the light source.

According to another aspect of the present invention, there is provided a method for activating a projection apparatus. The projection apparatus includes a control unit, a light source driving module, a light source and an imaging unit. The light source driving module is operable to drive the light source to provide an illumination beam. The imaging unit is operable so as to modulate the illumination beam into an image beam. The method for activating the projection apparatus includes the steps of:

(A) activating the control unit;

(B) causing the control unit to execute an activating thread for initializing the imaging unit after controlling initial driving of the light source by the light source driving module; and (C) causing the control unit to execute a monitoring thread for monitoring the light source driving module for a success signal that indicates successful provision of the illumination beam by the light source.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
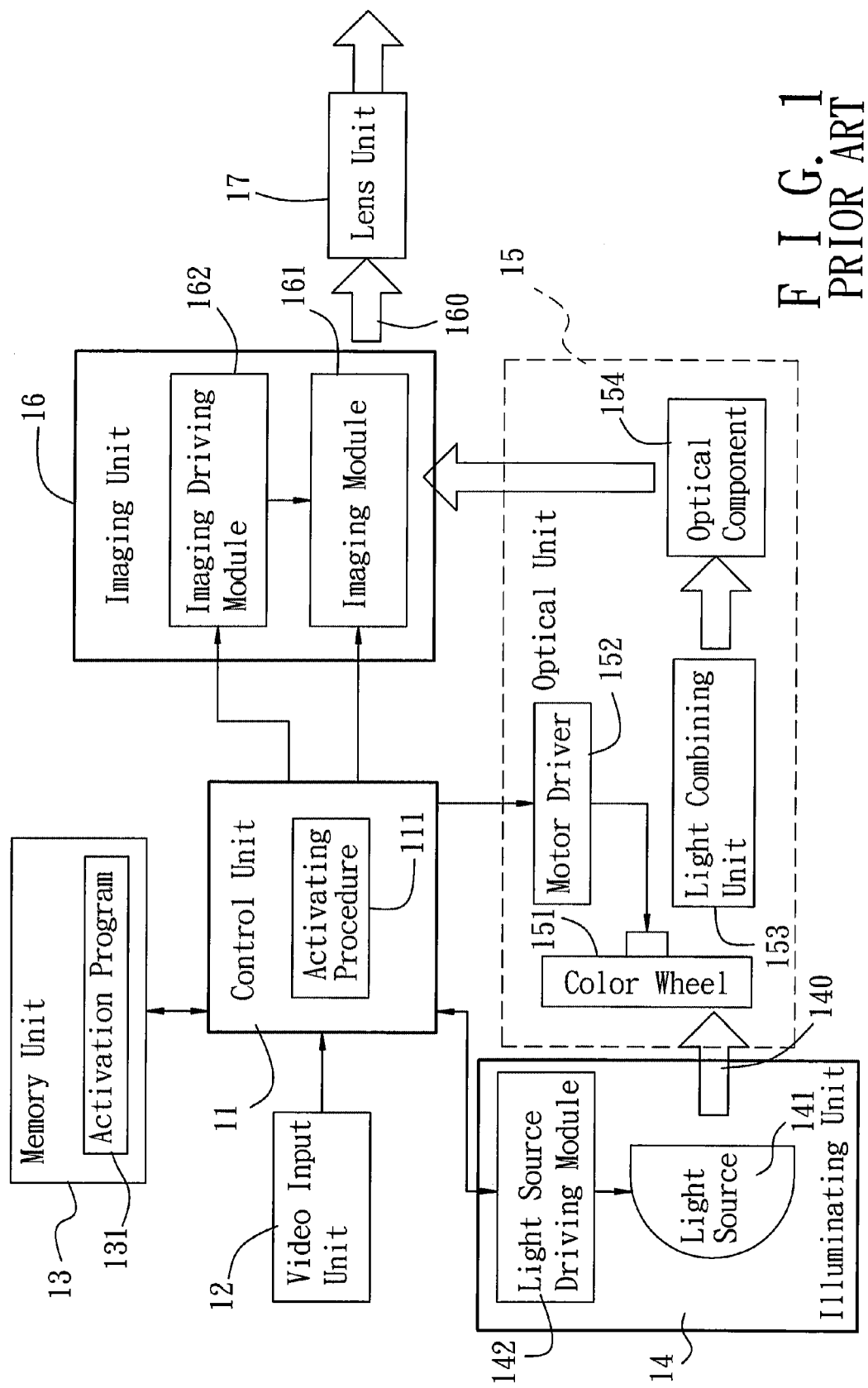
FIG. 1 is a block diagram of a conventional projection apparatus.
Figure 2:
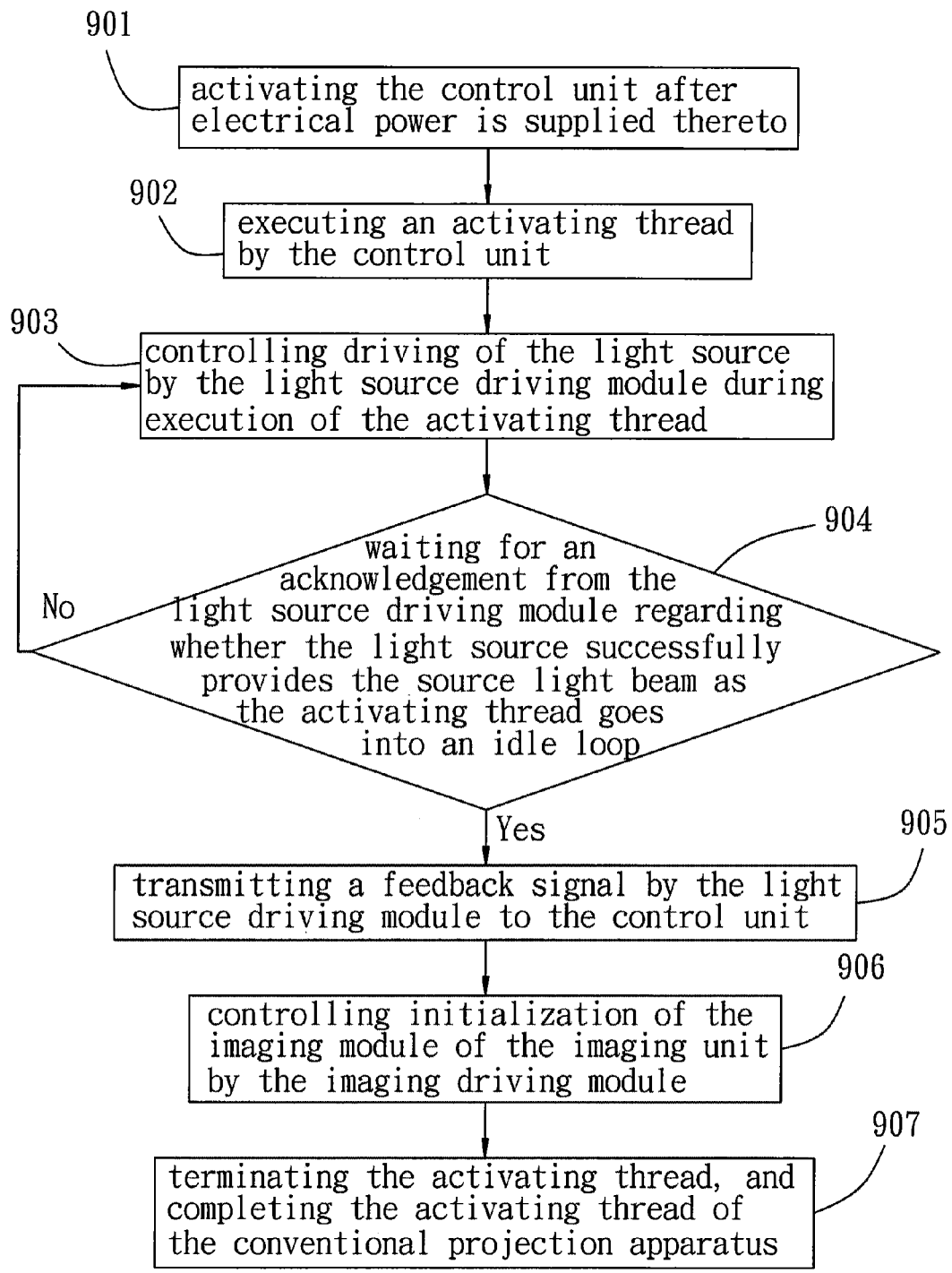
FIG. 2 is a flow chart, illustrating an activating thread of the conventional projection apparatus.
Figure 3:
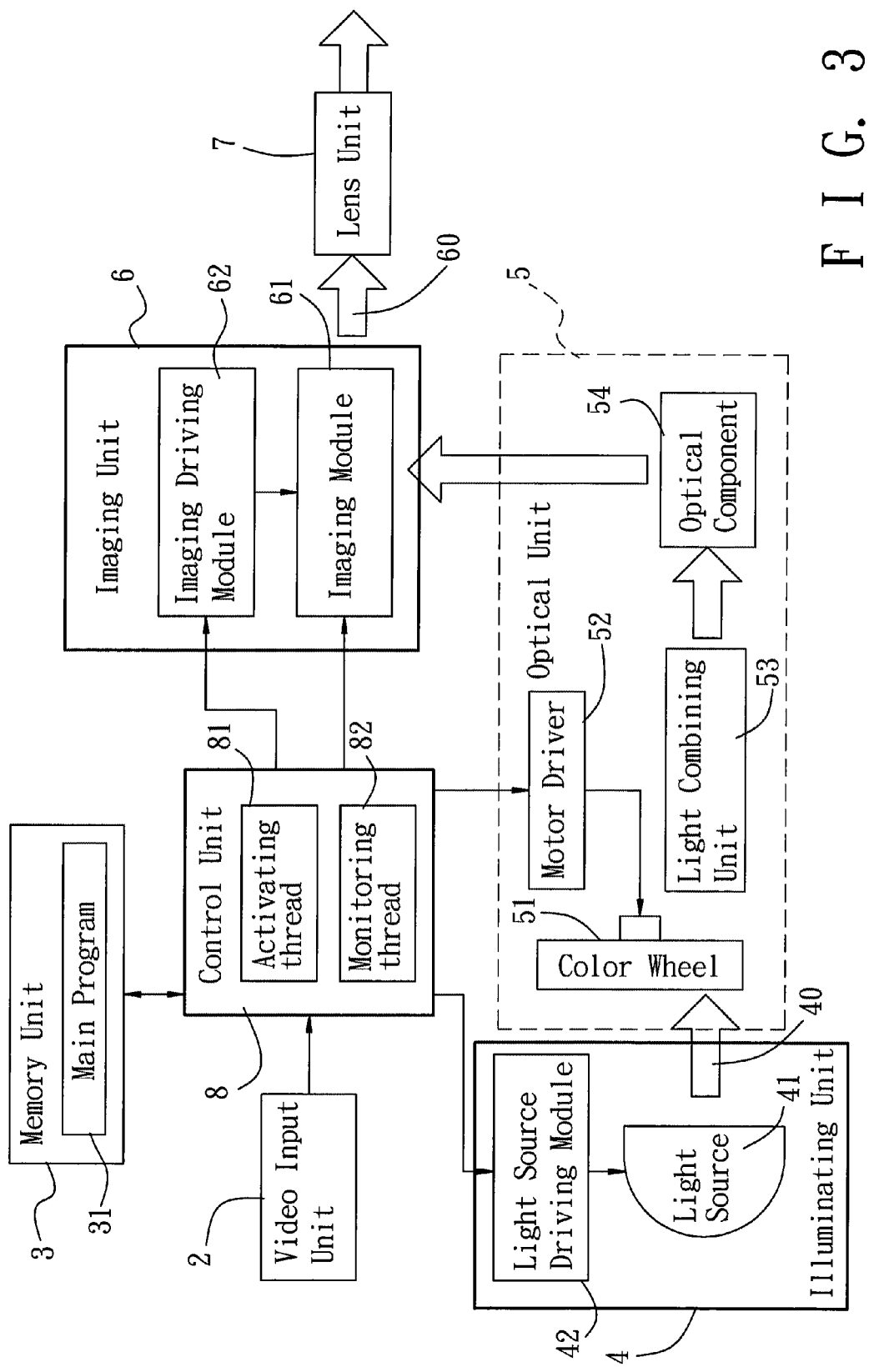
FIG. 3 is a block diagram of a preferred embodiment of a projection apparatus according to the present invention.

As shown in FIG. 3, a preferred embodiment of a projection apparatus according to the present invention includes a video input unit 2, a memory unit 3, an illuminating unit 4, an optical unit 5, an imaging unit 6, a lens unit 7, and a control unit 8.

The video input unit 2 includes a plurality of connection terminals (not shown) adapted to be connected to various video output devices, such as an optical disc player, and is responsible for converting video data provided by the video output devices into a format readable by the control unit 8 so that the projection apparatus can project an image corresponding to the video data.

The memory unit 3 stores a main program 3 necessary for activating the projection apparatus. In this embodiment, the memory unit 3 is a flash read only memory.

The illuminating unit 4 includes a light source 41, and a light source driving module 42 operable to drive the light source 41 to provide an illumination beam 40. The light source driving module 42 also provides a success signal that indicates successful provision of the illumination beam by the light source 41. In this embodiment, the light source driving module 42 is an integrated circuit chip that has a plurality of pins, where one of the pins serves to provide the success signal. Voltage level at the one of the pins is high when the light source 41 provides the illumination beam 40, and is low when the light source 41 does not provide the illumination beam 40.

The optical unit 5 is disposed to guide the illumination beam 40 into the imaging unit 6, and includes a color wheel 51, a motor driver 52 operable to drive rotation of the color wheel 51, a light combining unit 53 (e.g., an integrator rod), and at least one optical element 54. The color wheel 51, when in rotation, is capable of separating the illumination beam 40 into red, blue and green components.

The imaging unit 6 is operable so as to modulate the illumination beam 40 (i.e., the red, blue and green components) from the optical unit 5 into an image beam 60. The imaging unit 6 includes an imaging module 61 and an imaging driving module 62 for driving the imaging module 61 to modulate the illumination beam 40 into the image beam 60. In this embodiment, the projection apparatus is a digital light flowing (DLP) projection apparatus, and the imaging module 61 is a digital micromirror device (DMD), while the imaging driving module 62 is a corresponding DAD1000 chip. However, it should be noted herein that the projection apparatus of the present invention can be of other types, such as a high temperature polysilicon (HTP) transmissive liquid crystal projector or a liquid crystal on silicon (LCOS) reflective projector, in other embodiments of the present invention. When the projection apparatus is the HTP transmissive liquid crystal projector, the imaging module 61 is a thin film transistor-liquid crystal display (TFT-LCD), and when the projection apparatus is the LCoS reflective projector, the imaging module 61 is a LCoS chip.

The lens unit 7 is disposed on an optical path of the image beam 60 for projecting the image beam 60.

Figure 4:
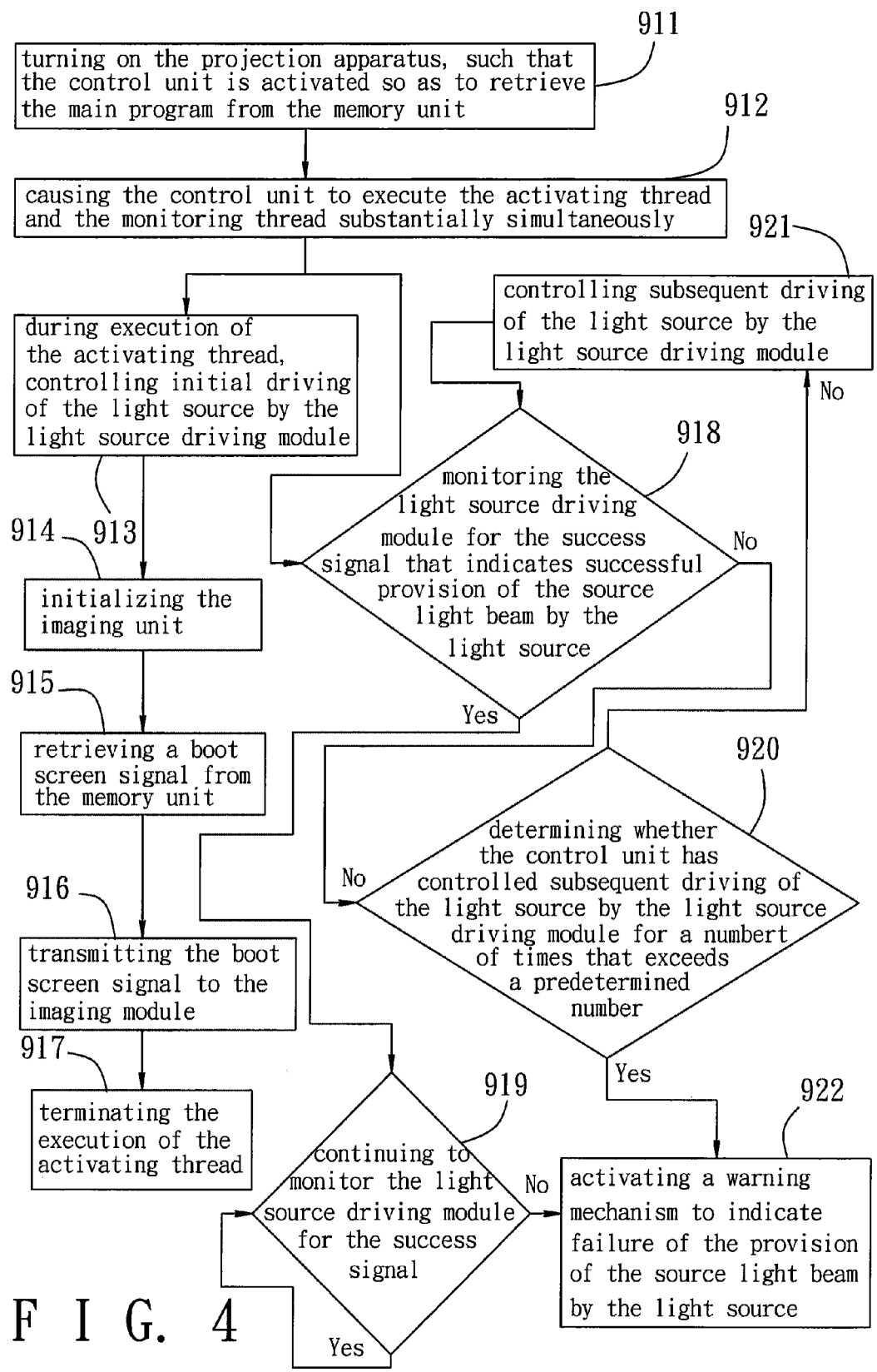
FIG. 4 is a flow chart, illustrating a method for activating a projection apparatus according to the preferred embodiment of the present invention.

The control unit 8 is coupled electrically to the video input unit 2, the memory unit 3, the illuminating unit 4, the optical unit 5, and the imaging unit 6. The control unit 8 retrieves the main program 31 from the memory unit 3, and is configured to execute an activating thread 81 for initializing the imaging unit 6 after controlling initial driving of the light source 41 by the light source driving module 42, and a monitoring thread 82 for monitoring the light source driving module 42 for the success signal that indicates successful provision of the illumination beam 40 by the light source 41 (i.e., by monitoring the voltage level of the one of the pins of the light source driving module 42). As shown in FIG. 3 and FIG. 4, a method for activating the projection apparatus includes the following steps:

In step 911, the control unit 8 is activated so as to retrieve the main program 31 from the memory unit 3 by turning on the projection apparatus.

In step 912, the control unit 8 is caused to execute the activating thread 81 and the monitoring thread 82 substantially simultaneously.

Execution of the activating thread 81 includes the following steps 913~917.

In step 913, the control unit 8 controls initial driving of the light source 41 by the light source driving module 42.

Subsequently, in step 914, the imaging unit 6 is initialized, the purpose of which is to put the imaging module 61 in an operating condition.

Next, in step 915, the control unit 8 retrieves a boot screen signal from the memory unit 3, and in step 916, the control unit 8 transmits the boot screen signal to the imaging module 61 of the imaging unit 6.

When steps 913~916 are completed, execution of the activating thread 81 is terminated (step 917).

Execution of the monitoring thread 82 includes the following steps 918~922.

In step 918, the control unit 8 monitors the light source driving module 42 for the success signal that indicates successful provision of the illumination beam 40 by the light source 41 (i.e., by monitoring the voltage level of the one of the pins of the light source driving module 42).

If the light source 41 is successfully driven by the light source driving module 42 to provide the illumination beam 40, and if the imaging module 61 has been initialized as shown in step 914 and has received the boot screen signal retrieved by the control unit 8 from the memory unit 3 as shown in step 916, the imaging module 61 modulates the illumination beam 40 received via the optical unit 5 into an image beam 60 that corresponds to the boot screen signal and that is subsequently projected by the lens unit 7 to display a boot screen.

In response to presence of the success signal in step 918, the control unit 8 continues to monitor the light source driving module 42 for the success signal (step 919). In this embodiment, the light source driving module 42 is the integrated circuit chip that has a plurality of the pins as described above. Therefore, the control unit 8 monitors to see if the voltage level at the one of the pins used to indicate the success signal remains high in step 919. In response to a transition from the presence to the absence of the success signal (transition of the voltage from high to low) while in step 919, the flow goes to step 922, where the control unit 8 activates a warning mechanism to indicate failure of the provision of the illumination beam 40 by the light source 41. In this embodiment, the warning mechanism is activated by triggering a warning component (not shown) in the projection apparatus. The warning component may be one of a light emitting diode (LED) and a buzzer, but is not limited thereto in other embodiments of the present invention. Lighting up of the light emitting diode or buzzing of the buzzer indicates the failure of the provision of the illumination beam 40 by the light source 41.

On the other hand, in response to absence of the success signal in step 918, the control unit 8 controls subsequent driving of the light source 41 by the light source driving module 42 (step 921) upon determination by the control unit 8 that the control unit 8 has not controlled the subsequent driving of the light source 41 by the light source driving module 42 for a number of times that exceeds a predetermined number (in the negative of step 920). In step 920, the control unit 8 determines whether the control unit 8 has controlled the subsequent driving of the light source 41 by the light source driving module 42 for a number of times that exceeds the predetermined number so as to avoid component damages due to repeated unsuccessful driving of the light source 41. In this embodiment, the predetermined number is four. In the positive of step 920, i.e., upon determination by the control unit 8 that the control unit 8 has controlled the subsequent driving of the light source 41 by the light source driving module 42 for a number of times that exceeds the predetermined number, the flow goes to step 922, where the control unit 8 activates the warning mechanism.

In sum, since the activating thread 81 and the monitoring thread 82 are executed by the control unit 8 substantially simultaneously, the activating thread 81 does not have to go into an idle loop for the control unit 8 to wait for the success signal from the light source driving module 42 indicating the successful provision of the illumination beam 40 by the light source 41 before initializing the imaging module 61. Consequently, the time it takes to activate the projection apparatus is shortened as compared to the prior art. Through actual experimentation, if initial driving of the light source 41 by the light source driving module 42 is successful, the projection apparatus can be completely activated within two seconds.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus comprising:
    an illuminating unit including a light source, and a light source driving module operable to drive said light source to provide an illumination beam;
    an imaging unit operable so as to modulate the illumination beam into an image beam;
    a lens unit disposed on an optical path of the image beam for projecting the image beam; and
    a control unit coupled electrically to said illuminating unit and said imaging unit, said control unit being configured to execute an activating thread for initializing said imaging unit after controlling initial driving of said light source by said light source driving module, and a monitoring thread for monitoring said light source driving module for a success signal that indicates successful provision of the illumination beam by said light source.

2. The projection apparatus as claimed in claim 1, wherein said control unit controls subsequent driving of said light source by said light source driving module in response to absence of the success signal during execution of the monitoring thread.

3. The projection apparatus as claimed in claim 2, further comprising a warning mechanism activated by said control unit in response to a transition from presence to absence of the success signal during execution of the monitoring thread.

4. The projection apparatus as claimed in claim 2, further comprising a warning mechanism activated by said control unit upon determination by said control unit that said control unit has controlled the subsequent driving of said light source by said light source driving module for a number of times that exceeds a predetermined number during execution of the monitoring thread.

5. A method for activating a projection apparatus, the projection apparatus including a control unit, a light source driving module, a light source and an imaging unit, the light source driving module being operable to drive the light source to provide an illumination beam, the imaging unit being operable so as to modulate the illumination beam into an image beam, said method for activating the projection apparatus comprising the steps of:
   (A) activating the control unit;
   (B) causing the control unit to execute an activating thread for initializing the imaging unit after controlling initial driving of the light source by the light source driving module; and
   (C) causing the control unit to execute a monitoring thread for monitoring the light source driving module for a success signal that indicates successful provision of the illumination beam by the light source.

6. The method for activating a projection apparatus as claimed in claim 5, wherein step (C) further includes controlling subsequent driving of the light source by the light source driving module in response to absence of the success signal.

7. The method for activating a projection apparatus as claimed in claim 6, wherein step (C) further includes activating a warning mechanism in response to a transition from presence to absence of the success signal.

8. The method for activating a projection apparatus as claimed in claim 6, wherein step (C) further includes activating a warning mechanism upon determination by the control unit that the control unit has controlled the subsequent driving of the light source by the light source driving module for a number of times that exceeds a predetermined number.

* * * * *